(12) United States Patent
Korlapati

(10) Patent No.: US 7,860,833 B1
(45) Date of Patent: Dec. 28, 2010

(54) DERIVING SESSION LEVEL STATISTICS FOR TEMPORARY TABLES

(75) Inventor: Ramakrishna Korlapati, El Segundo, CA (US)

(73) Assignee: Teradata US, Inc., Dayton, OH (US)

( * ) Notice: Subject to any disclaimer, the term of this patent is extended or adjusted under 35 U.S.C. 154(b) by 443 days.

(21) Appl. No.: 11/946,640

(22) Filed: Nov. 28, 2007

(51) Int. Cl.
    *G06F 17/30* (2006.01)

(52) U.S. Cl. .............. 707/637; 707/660; 707/713; 707/714; 707/715; 707/717; 707/718; 707/731

(58) Field of Classification Search .............. 707/2, 707/10, 637, 660, 713, 714, 715, 716, 717, 707/718, 731, 999.002, 999, 101
    See application file for complete search history.

(56) References Cited

U.S. PATENT DOCUMENTS

| | | | | |
|---|---|---|---|---|
| 5,701,461 A | * | 12/1997 | Dalal et al. | 1/1 |
| 5,978,789 A | * | 11/1999 | Griffin et al. | 1/1 |
| 6,185,556 B1 | | 2/2001 | Snodgrass et al. | 707/687 |
| 6,252,876 B1 | * | 6/2001 | Brueckheimer et al. | 370/394 |
| 6,275,818 B1 | * | 8/2001 | Subramanian et al. | 1/1 |
| 6,477,535 B1 | | 11/2002 | Mirzadeh | 1/1 |
| 6,684,203 B1 | * | 1/2004 | Waddington et al. | 707/714 |
| 6,691,101 B2 | * | 2/2004 | MacNicol et al. | 707/714 |
| 6,714,935 B1 | * | 3/2004 | Delo | 707/803 |
| 6,801,903 B2 | * | 10/2004 | Brown et al. | 1/1 |
| 7,127,449 B2 | * | 10/2006 | Barsness et al. | 1/1 |
| 7,127,457 B1 | * | 10/2006 | Ghazal | 1/1 |
| 7,213,012 B2 | * | 5/2007 | Jakobsson | 1/1 |
| 7,383,246 B2 | * | 6/2008 | Lohman et al. | 1/1 |
| 7,392,259 B2 | * | 6/2008 | Lee et al. | 715/234 |
| 7,430,562 B1 | * | 9/2008 | Bedell et al. | 1/1 |
| 2002/0184228 A1 | * | 12/2002 | Ghukasyan et al. | 707/101 |
| 2003/0088579 A1 | * | 5/2003 | Brown et al. | 707/104.1 |
| 2004/0225639 A1 | * | 11/2004 | Jakobsson et al. | 707/2 |
| 2005/0044063 A1 | * | 2/2005 | Barsness et al. | 707/2 |
| 2005/0097078 A1 | * | 5/2005 | Lohman et al. | 707/2 |
| 2005/0209988 A1 | * | 9/2005 | Cunningham et al. | 707/1 |
| 2006/0253422 A1 | * | 11/2006 | Narasayya et al. | 707/2 |
| 2007/0043697 A1 | * | 2/2007 | Driesch et al. | 707/2 |
| 2008/0177722 A1 | * | 7/2008 | Lohman et al. | 707/4 |
| 2008/0275840 A1 | * | 11/2008 | Burger et al. | 707/2 |

* cited by examiner

*Primary Examiner*—Don Wong
*Assistant Examiner*—Thanh-Ha Dang
(74) *Attorney, Agent, or Firm*—Howard Speight

(57) ABSTRACT

Statistics for temporary tables are used in optimizing the execution of a database request. A first temporary table is created using data from a data source as the result of performing an operation while executing the request. A subset of the demographics of the data source is saved in a session level memory as the demographics of the first temporary table. The saved demographics are used in optimizing the execution of the portion of the request involving the first temporary table.

18 Claims, 4 Drawing Sheets

DERIVING SESSION LEVEL STATISTICS FOR TEMPORARY TABLES

BACKGROUND

Often times, global temporary or volatile tables, referred to generally as "temporary tables" are used in a session, i.e., a series of database interactions with a user between a login and a logoff, or a stored procedure, i.e., a collection of SQL statements associated with a named identifier and saved in a dictionary, to hold the intermediate results of some operation, or to split large queries into manageable and re-usable small chunks. Generally, these temporary tables are used or reused in the subsequent "selects" of the main queries.

Database optimizers use column demographics and histograms to produce optimal plans. Collecting such statistics for temporary tables is a challenge.

SUMMARY

In general, in one aspect, the invention features a method for using statistics for temporary tables in optimizing the execution of a database request. The method includes creating a first temporary table using data from a data source as the result of performing an operation while executing the request. The method further includes saving a subset of the demographics of the data source in a session level memory as the demographics of the first temporary table. The method further includes using the saved demographics in optimizing the execution of the portion of the request involving the first temporary table.

Implementations of the invention may include one or more of the following. The data source may be a single table without any filtering conditions and saving a subset of the demographics of the data source in a session level memory as the demographics of the first temporary table may include saving histograms from the single table as the demographics of the first temporary table. The data source may be a single table with filter conditions and saving a subset of the demographics of the data source in a session level memory as the demographics of the first temporary table may include saving the summary demographics of the columns of the table as the demographics of the first temporary table. The data source may be a plurality of tables accessed when executing the database request and saving a subset of the demographics of the data source in a session level memory as the demographics of the first temporary table may include saving the summary demographics of the columns of the plurality of the tables as the demographics of the first temporary table. The data source may be a plurality of sources for inserts and/or selects and saving a subset of the demographics of the data source in a session level memory as the demographics of the first temporary table may include merging the individual demographics from the plurality of sources as the demographics of the first temporary table. The method may further include creating a second temporary table using data from the second temporary table as the result of performing an operation on the first temporary table while executing the request. The method may further include saving a subset of the demographics of the first temporary table in a session level memory as the demographics of the second temporary table. The method may further include using the saved demographics in optimizing the execution of the portion of the request involving the second temporary table.

In general, in another aspect, the invention features a database system. The database system includes one or more nodes; a plurality of CPUs, each of the one or more nodes providing access to one or more CPUs; a plurality of virtual processes, each of the one or more CPUs providing access to one or more virtual processes; each virtual process configured to manage data, including rows from the set of database table rows, stored in one of a plurality of data-storage facilities; and a process configured to use statistics for temporary tables in optimizing the execution of a database request. The process creates a first temporary table using data from a data source as the result of performing an operation while executing the request. The process further saves a subset of the demographics of the data source in a session level memory as the demographics of the first temporary table. The process further uses the saved demographics in optimizing the execution of the portion of the request involving the first temporary table.

In general, in another aspect, the invention features a computer program, stored in a tangible medium, for using statistics for temporary tables in optimizing the execution of a database request. The program includes executable instructions that cause a computer to create a first temporary table using data from a data source as the result of performing an operation while executing the request. The program further includes executable instructions that cause the computer to save a subset of the demographics of the data source in a session level memory as the demographics of the first temporary table. The program further includes executable instructions that cause the computer to use the saved demographics in optimizing the execution of the portion of the request involving the first temporary table.

DETAILED DESCRIPTION

Figure 1:
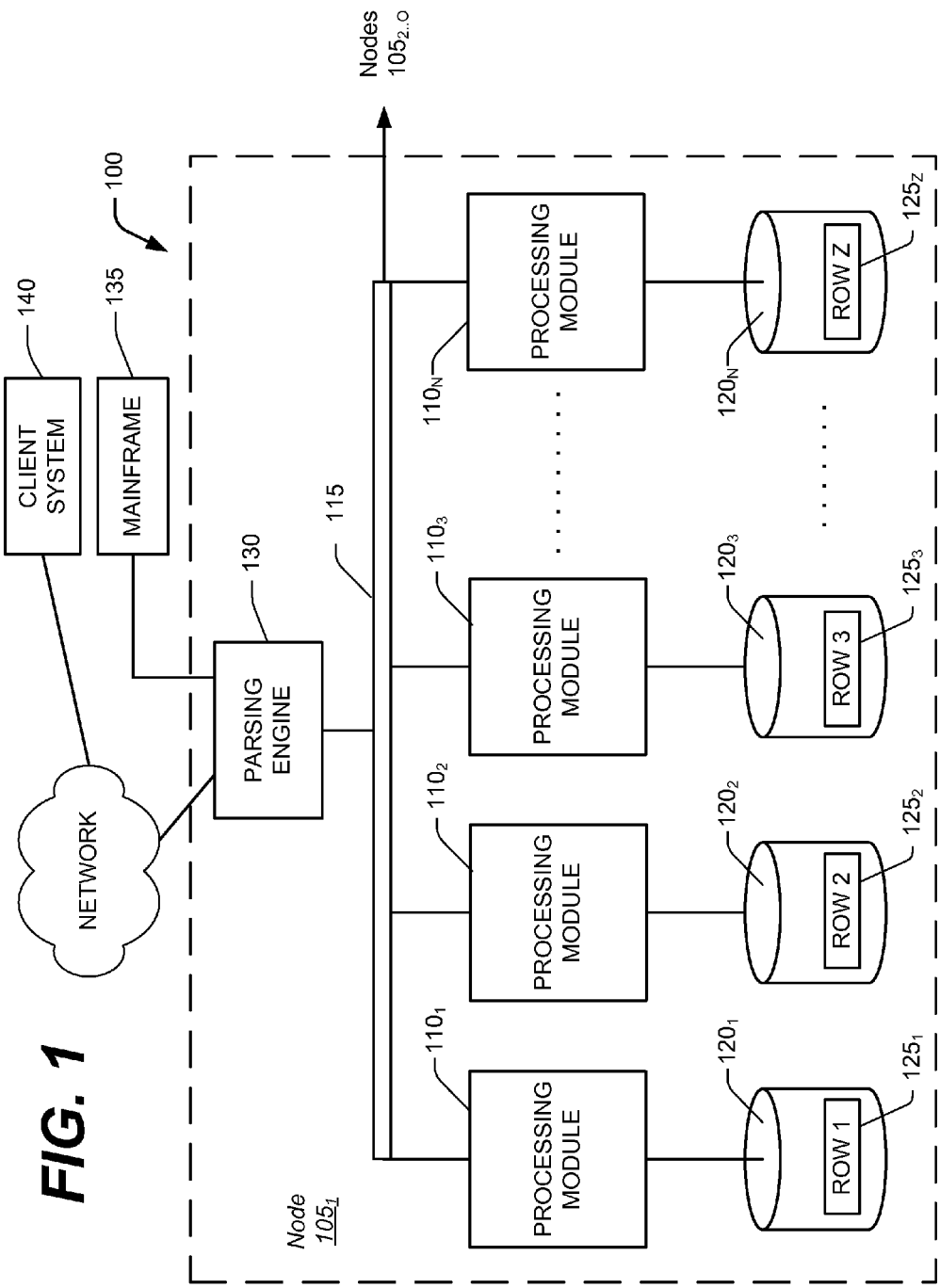
FIG. 1 is one example of a block diagram of a node of a database system.

The database row storage technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
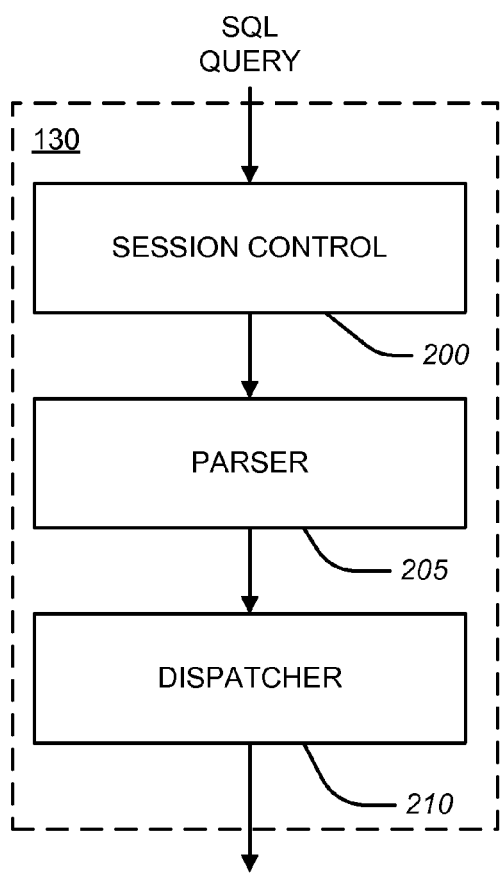
FIG. 2 is one example of a block diagram of a parsing engine.

In an example system, the parsing engine 130 is made up of three components: a session control 200, a parser 205, and a dispatcher 210, as shown in FIG. 2. Session control 200 provides a logon and logoff function. It accepts a request for authorization to access the database, verifies it, and then either allows or disallows the access.

Figure 3:
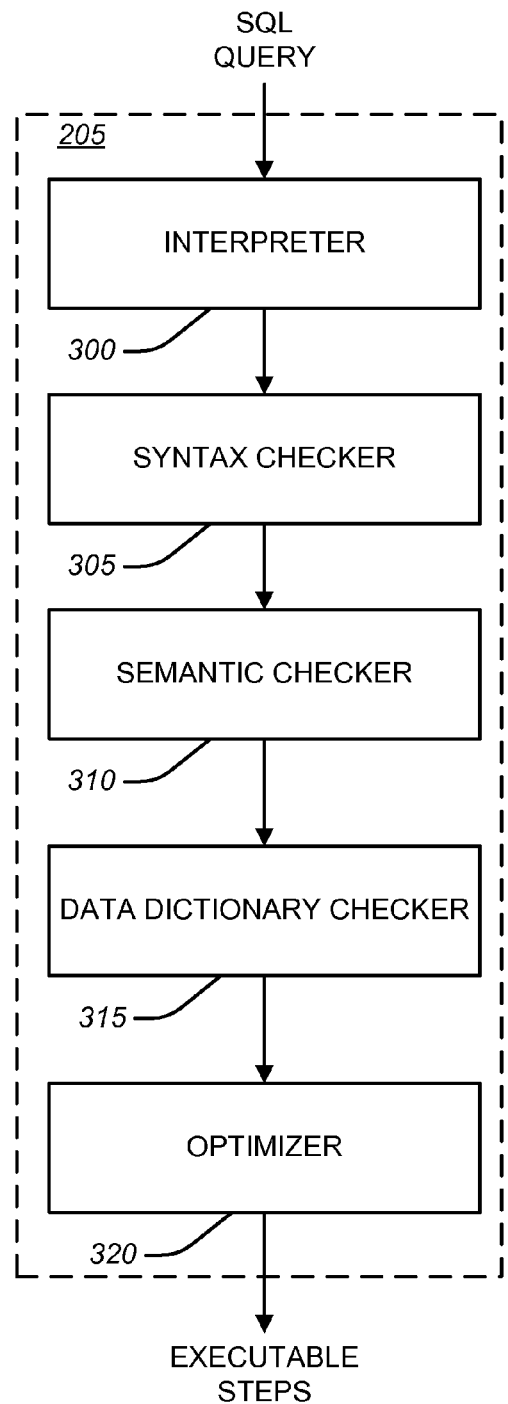
FIG. 3 is a flow chart of a parser.

Once session control 200 allows a session to begin, a user may submit a SQL request, which is routed to parser 205. As illustrated in FIG. 3, parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops, for example, the least expensive plan to perform the request.

A technique for capturing and using demographics for the temporary tables without the need to re-collect the statistics helps produce optimal plans and improves performance of subsequent selects involving these temporary tables.

Figure 4:
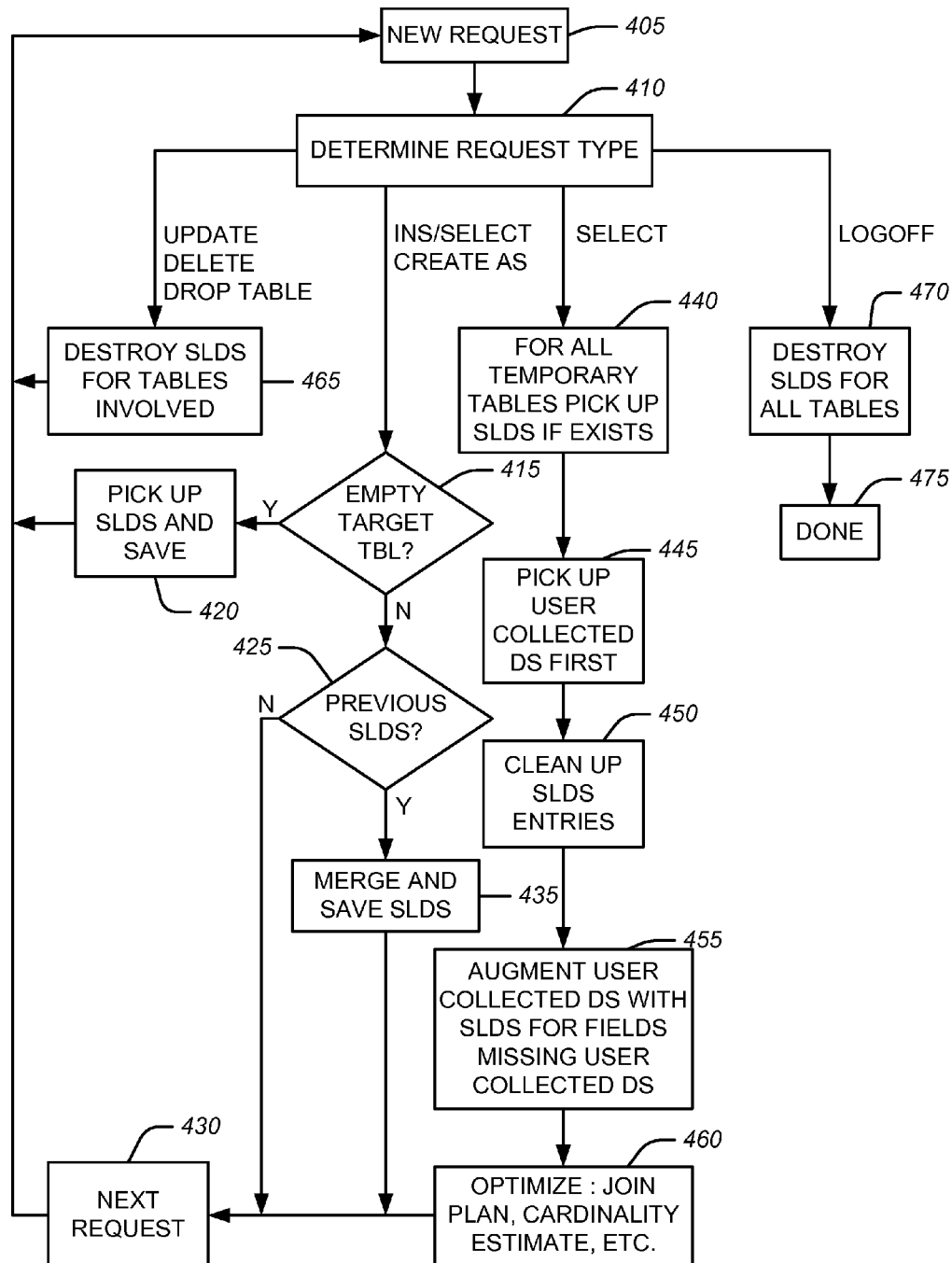
FIG. 4 is a flow chart showing session level demographic infrastructure.

A derived statistics infrastructure in a database can derive and propagate single column or multi-column demographics while doing necessary adjustments, across joins/aggregations/analytical functions, etc. Using this infrastructure, as illustrated in FIG. 4, the demographics of the final spool file or a base table which is being inserted or merged into the target temporary table can be captured. The captured demographics are saved in a session level memory pool which survives across the requests of the same session. These demographics are retrieved and used to optimize the subsequent "selects" involving these temporary tables.

Referring to FIG. 4, when a new request (e.g., a new utility or query) is received (block 405), the system determines the request type (block 410).

If the request is an INSERT/SELECT or CREATE AS, the system determines if the target temporary table is empty (block 415). If it is, the session level demographics ("SLDS") are picked up, as described below with respect to FIG. 5, and saved (block 420). The system then returns to block 405. If the target temporary table is not empty (block 415), the system determines if SLDS already exist for the target temporary table (block 425). If they do not this is an indication that the previous demographics have been invalidated and should not be further updated. In that case, the system moves on to process the next request (block 430) and returns to block 405. If SLDS already exist for the target temporary table (block 425), the new SLDS is merged with the previous SLDS and the result is saved (block 435). The system then moves to the next request (block 430) and returns to block 405.

If the request is a select, the system picks up SLDS for all temporary tables for which such data exists (block 440). The system first picks up user collected demographics (i.e., demographics collected by way of a system command, such as a COLLECT STATISTICS command, after the data population) (block 445) and then "cleans up" the SLDS entries (i.e., uses the user collected demographics to remove inconsistencies and conflicts, if any) (block 450). The system then augments the user collected demographics with SLDS for columns that are missing user collected demographics (block 455). The system then optimizes the join plan, cardinality, etc. (block 460) and moves to the next request (block 430), returning to block 405.

If the request is an UPDATE, DELETE, or DROP TABLE, the system destroys the SLDS for the temporary table involved in the request (block 465).

If the request is a LOGOFF, the system destroys the SLDS for all tables (block 470) and the session is complete (block 475).

The following are examples of two forms of data population are supported to capture session level demographics for temporary tables:

Create Table <Target Temp Table> AS <Source Table> or <Select query block>

Insert into <Target Temp Table><Select query block>

Figure 5:
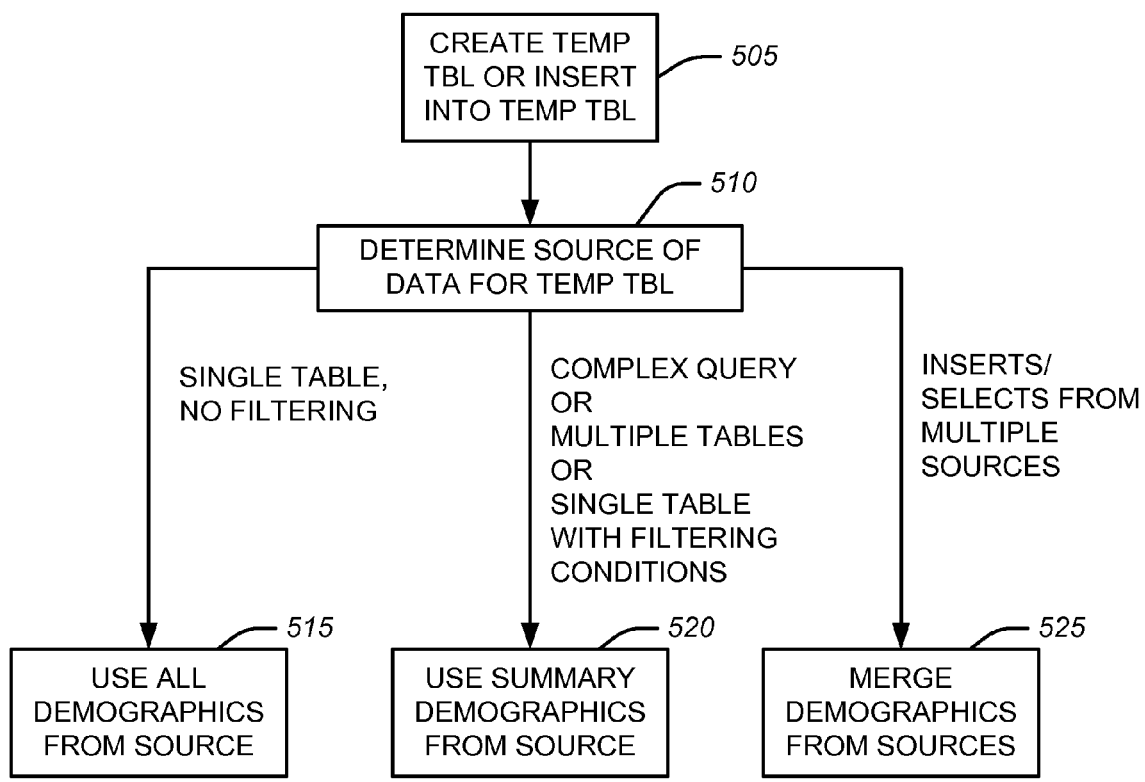
FIG. 5 is a flow chart showing the creation of temporary table demographics.

The derived statistics assigned to a temporary table depend on the source of the data when the temporary table is created or when data is inserted into the temporary table (block 505), as shown in FIG. 5. Thus, when creating SLDS for a temporary table, the system considers the source of the data (block 510)

If the source is a single table without any filtering conditions, the HISTOGRAMS from the source are automatically propagated and saved for the temporary table (block 515).

For example, given the statement "Create volatile table t_orderstbl AS OrdersTbl WITH DATA;" all the available source demographics including the HISTOGRAMS are propagated to "t_orderstbl".

If the source is a complex query with multiple tables or a single table with filtering conditions, only the summary demographics such as (min distinct values, best distinct values, max distinct values, high mode frequency, num nulls) are propagated (block 520).

If the target temporary table is populated using multiple insert/selects, the individual demographics from multiple sources are merged and the final demographics are derived (block 525).

If the data is populated and the target table is used in a subsequent "select" in the same multi-statement request, the target derived statistics and estimated row count saved are available and used to optimize subsequent "select".

For example, given the multi-statement request,

```
insert into t_orderstbl select * from orderhdr where busi-
   nessid in (10, 20);
   ; select * from t_orderhdr, orders where
      t_orderhdr.ordernum=orders.ordernum
   ;
```

The derived statistics and estimated row count from the source "select" of insert/select are available to optimize the subsequent "select" statement.

Once the temporary table is populated and the derived statistics are captured, any subsequent data manipulation statement such as delete/update invalidates the saved session level derived statistics for this table.

The session level derived statistics don't override the statistics that are collected after the data is populated but augment for the column(s) which have missing statistics.

The session level derived statistics are destroyed if the table is dropped or the session is logged off.

This enhancement can also be easily extended and applied to the permanent tables, but this is more suitable for temporary tables.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for using statistics for temporary tables in optimizing the execution of a database request, the method comprising:
   creating a first temporary table using data from a data source as the result of performing an operation while executing the database request;
   after creating the first temporary table, saving a subset of demographics of the data source in a session level memory, which is memory available to a session with which the database request is associated for a life of the session, as the demographics of the first temporary table; and
   using the saved demographics of the first temporary table in optimizing the execution of a portion of the database request involving the first temporary table.

2. The method of claim 1, wherein the data source is a single table without any filtering conditions and saving the subset of demographics of the data source in the session level memory as the demographics of the first temporary table comprises:
   saving histograms from the single table as the demographics of the first temporary table.

3. The method of claim 1, wherein the data source is a single table with filter conditions and wherein saving the subset of demographics of the data source in the session level memory as the demographics of the first temporary table comprises:
   saving summary demographics of columns of the single table as the demographics of the first temporary table.

4. The method of claim 1, wherein the data source is a plurality of tables accessed when executing the database request and wherein saving the subset of demographics of the data source in the session level memory as the demographics of the first temporary table comprises:
   saving summary demographics of columns of the plurality of the tables as the demographics of the first temporary table.

5. The method of claim 1, wherein the data source is a plurality of sources for inserts and selects and wherein saving the subset of demographics of the data source in the session level memory as the demographics of the first temporary table comprises:
   merging individual demographics from the plurality of sources as the demographics of the first temporary table.

6. The method of claim 1, further comprising:
   creating a second temporary table using data from the second temporary table as a result of performing an operation on the first temporary table while executing the database request;
   saving a subset of the demographics of the first temporary table in a session level memory as the demographics of the second temporary table; and
   using the saved demographics of the second temporary table in optimizing the execution of a portion of the database request involving the second temporary table.

7. A database system comprising:
   one or more nodes;
   a plurality of CPUs, each of the one or more nodes providing access to one or more CPUs;
   a plurality of virtual processes, each of the one or more CPUs providing access to one or more virtual processes;
   each virtual process configured to manage data, including rows from the set of database table rows, stored in one of a plurality of data-storage facilities;
   a process configured to use statistics for temporary tables in optimizing the execution of a database request by:
      creating a first temporary table using data from a data source as the result of performing an operation while executing the database request;
      after creating the first temporary table, saving a subset of demographics of the data source in a session level memory, which is memory available to a session with which the database request is associated for a life of the session, as the demographics of the first temporary table; and
      using the saved demographics of the first temporary table in optimizing the execution of a portion of the database request involving the first temporary table.

8. The database system of claim 7, wherein the data source is a single table without any filtering conditions and saving the subset of demographics of the data source in the session level memory as the demographics of the first temporary table comprises:
   saving histograms from the single table as the demographics of the first temporary table.

9. The database system of claim 7, wherein the data source is a single table with filter conditions and wherein saving the subset of demographics of the data source in the session level memory as the demographics of the first temporary table comprises:
   saving summary demographics of columns of the single table as the demographics of the first temporary table.

10. The database system of claim 7, wherein the data source is a plurality of tables accessed when executing the database request and wherein saving the subset of demographics of the data source in the session level memory as the demographics of the first temporary table comprises:
   saving summary demographics of columns of the plurality of the tables as the demographics of the first temporary table.

11. The database system of claim 7, wherein the data source is a plurality of sources for inserts and selects and wherein saving the subset of demographics of the data source in the session level memory as the demographics of the first temporary table comprises:

merging individual demographics from the plurality of sources as the demographics of the first temporary table.

12. The database system of claim 7, wherein the process further comprises:

creating a second temporary table using data from the second temporary table as a result of performing an operation on the first temporary table while executing the database request;

saving a subset of the demographics of the first temporary table in a session level memory as the demographics of the second temporary table; and using the saved demographics of the second temporary table in optimizing the execution of a portion of the database request involving the second temporary table.

13. A computer program, stored in a tangible medium, for using statistics for temporary tables in optimizing the execution of a database request, the program comprising executable instructions that cause a computer to:

create a first temporary table using data from a data source as the result of performing an operation while executing the database request;

after creating the first temporary table, save a subset of demographics of the data source in a session level memory, which is memory available to a session with which the database request is associated for a life of the session, as the demographics of the first temporary table; and use the saved demographics of the first temporary table in optimizing the execution of a portion of the database request involving the first temporary table.

14. The computer program of claim 13, wherein the data source is a single table without any filtering conditions and when saving the subset of demographics of the data source in the session level memory as the demographics of the first temporary table, the computer:

saves histograms from the single table as the demographics of the first temporary table.

15. The computer program of claim 13, wherein the data source is a single table with filter conditions and when saving the subset of demographics of the data source in the session level memory as the demographics of the first temporary table, the computer:

saves summary demographics of columns of the single table as the demographics of the first temporary table.

16. The computer program of claim 13, wherein the data source is a plurality of tables accessed when executing the database request and when saving the subset of demographics of the data source in the session level memory as the demographics of the first temporary table, the computer:

saves summary demographics of columns of the plurality of the tables as the demographics of the first temporary table.

17. The computer program of claim 13, wherein the data source is a plurality of sources for inserts and selects and when saving the subset of demographics of the data source in the session level memory as the demographics of the first temporary table, the computer:

merges individual demographics from the plurality of sources as the demographics of the first temporary table.

18. The computer program of claim 13, the program further comprising executable instructions that cause the computer to:

create a second temporary table using data from the second temporary table as a result of performing an operation on the first temporary table while executing the database request;

save a subset of the demographics of the first temporary table in a session level memory as the demographics of the second temporary table; and use the saved demographics of the second temporary table in optimizing the execution of a portion of the database request involving the second temporary table.

* * * * *